July 5, 1932.    H. HANSEN    1,866,033
KEY CUTTING APPARATUS
Filed Feb. 17, 1926    4 Sheets-Sheet 1
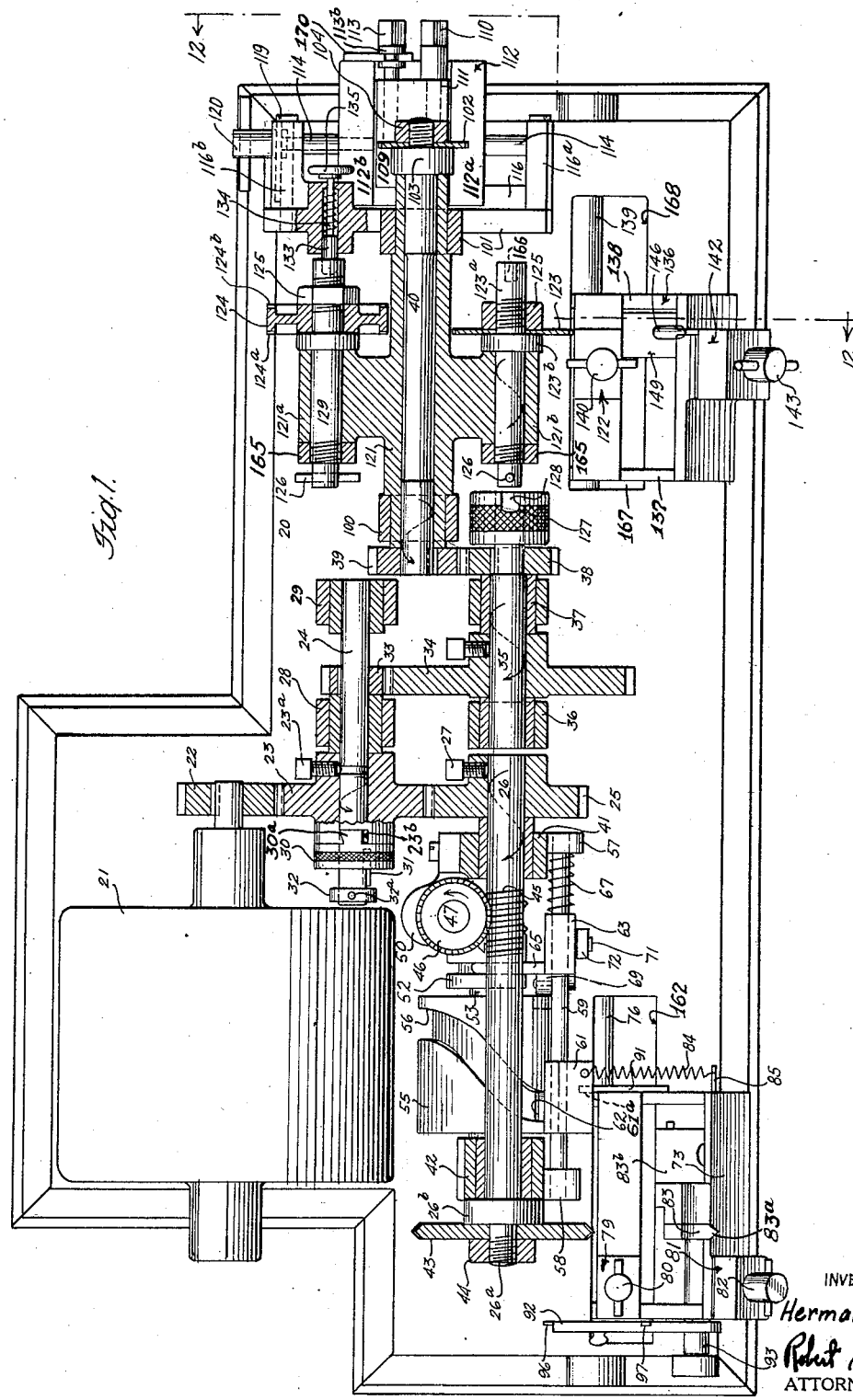
INVENTOR
Herman Hansen
Robert S. Blair
ATTORNEY July 5, 1932.   H. HANSEN   1,866,033
KEY CUTTING APPARATUS
Filed Feb. 17, 1926   4 Sheets-Sheet 2
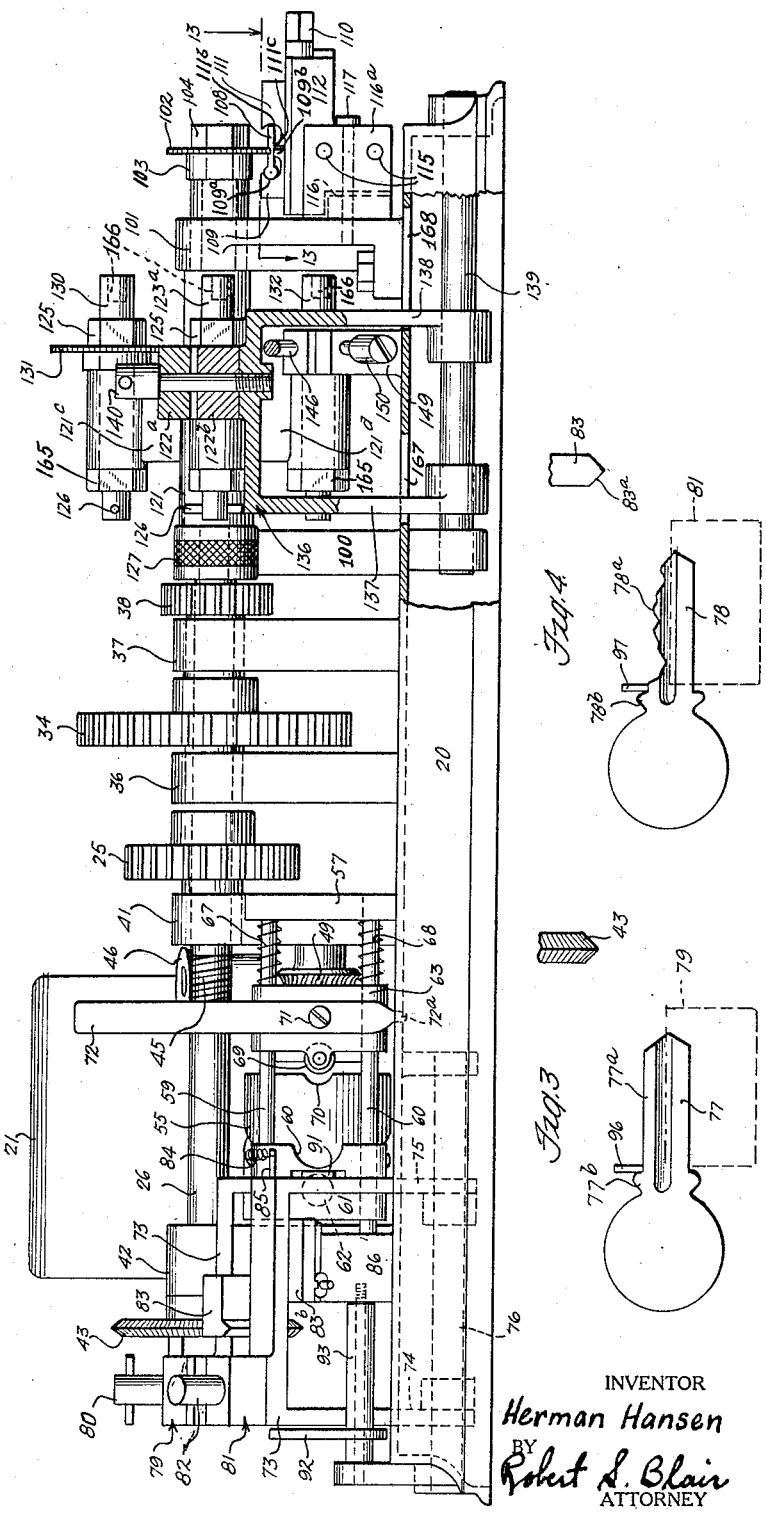
INVENTOR
Herman Hansen
BY
Robert S. Blair
ATTORNEY July 5, 1932.　　　H. HANSEN　　　1,866,033
KEY CUTTING APPARATUS
Filed Feb. 17, 1926　　　4 Sheets-Sheet 3

INVENTOR
Herman Hansen
BY
Robert S. Blair
ATTORNEY

July 5, 1932.   H. HANSEN   1,866,033
KEY CUTTING APPARATUS
Filed Feb. 17, 1926   4 Sheets-Sheet 4
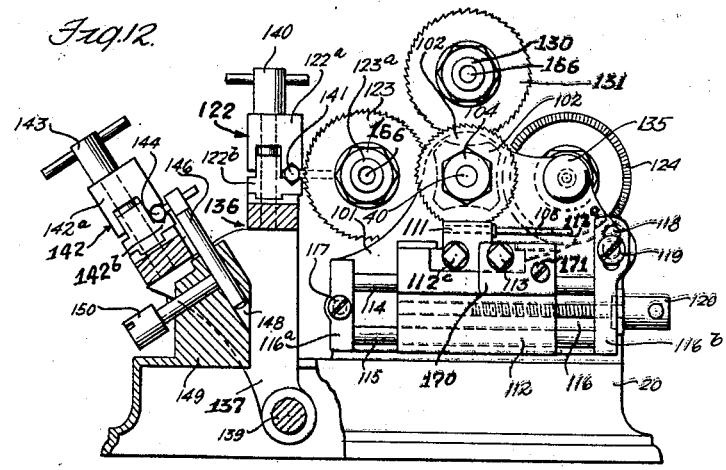
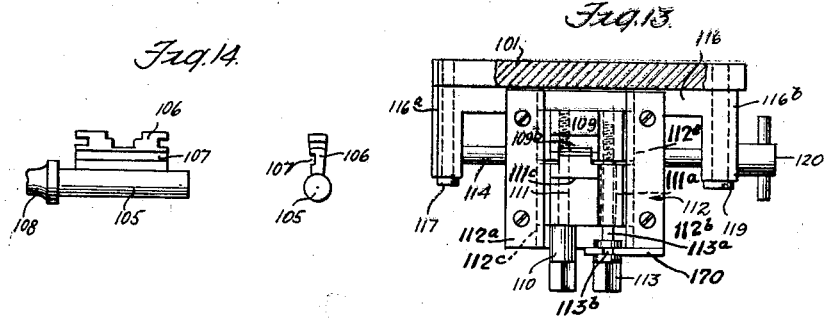
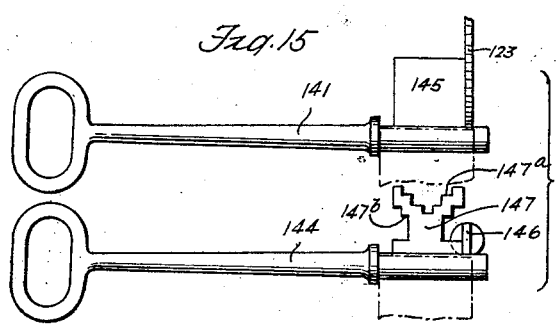
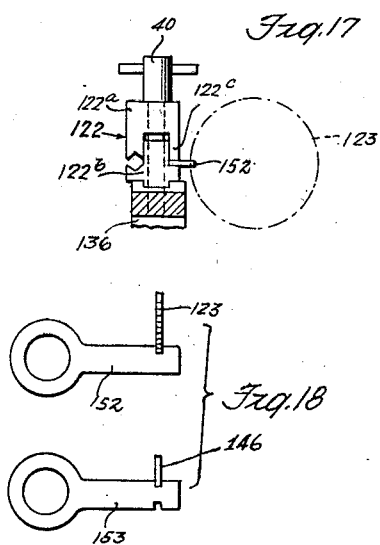
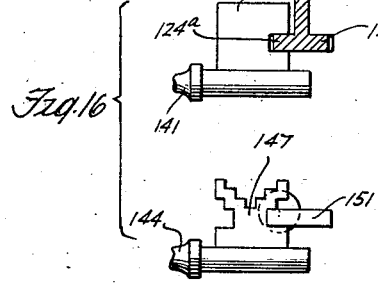
INVENTOR
*Herman Hansen*
BY
*Robert S. Blair*
ATTORNEY

Patented July 5, 1932

1,866,033

UNITED STATES PATENT OFFICE

HERMAN HANSEN, OF NEW YORK, N. Y., ASSIGNOR TO FRANCIS KEIL & SON, INC., A CORPORATION OF NEW YORK

KEY CUTTING APPARATUS

Application filed February 17, 1926. Serial No. 88,729.

This invention relates to apparatus for cutting keys. One of the objects thereof is to provide key cutting apparatus which is thoroughly practical and efficient. Another object is to provide apparatus of the above nature which is capable of operating with a high degree of accuracy. Another object is to provide apparatus of the above nature which is capable of a wide range of use. Another object is to provide apparatus of the above nature which is simple to operate. Another object is to provide apparatus of the above nature which is of compact construction and rugged, adapted to withstand hard and continued usage. Other objects will be in part obvious or in part pointed out hereinafter.

The invention accordingly consists in the features of construction, combinations of elements, and arrangements of parts as will be exemplified in the structure to be hereinafter described and the scope of the application of which will be indicated in the following claims.

In the accompanying drawings in which is shown one of the various possible embodiments of this invention, Figure 1 is a top plan view with certain parts of the apparatus shown in section;

Figure 2 is a front elevation, certain parts being broken away to afford a better view of the construction;

Figure 3 shows diagrammatically a key blank in relation to certain elements of the apparatus;

Figure 4 is a view similar to Figure 3, showing a master key;

Figure 12 is a section taken substantially along the line 12—12 of Figure 1;

Figure 13 is a section taken substantially along the line 13—13 of Figure 2;

Figure 14 shows a side elevation and an end elevation of a barrel key;

Figure 15 shows diagrammatically a key blank and a master key of the barrel type in relation to certain elements of the apparatus;

Figure 16 shows the same key blank and master key in relation to other parts of the apparatus;

Figure 17 shows a key-holding mechanism shown in Figure 12 but in a position different from that assumed thereby in Figure 12, and Figure 18 shows two views of a key which is held by the mechanism of Figure 17 to be operated upon.

Similar reference characters refer to similar parts throughout the several views of the drawings.

Figure 5:
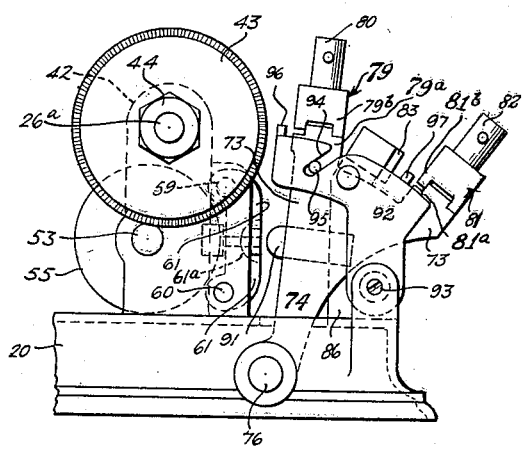
Figure 5 is an elevation showing portions of the apparatus as viewed from the left of Figure 2.

Referring now to the drawings in detail and first to Figure 1, this key cutting apparatus is shown as being mounted upon a suitable platform or base 20 and driven by an electric motor 21. It will be understood, of course, that any other suitable form of power drive may be substituted for the motor. Upon the armature shaft of the motor 21 is shown a gear 22 which meshes with a gear 23 loosely rotating upon a shaft 24. This gear 23 meshes with a gear 25 which is fixed upon a shaft 26, for example, by means of a set screw 27. A set screw 23a threaded into the hub of the gear 23 engages with a circumferential groove in the surface of the shaft 24 and prevents longitudinal movement of the gear 23 along the shaft 24 while permitting relative rotation of these parts. The shaft 24 is rotatably supported in bearing supports 28 and 29 and may be connected in driving relation with the gear 23 or disconnected therefrom by means of a clutch collar 30. This collar 30 is slidable longitudinally of the shaft 24 and splined thereto by a key 31 and has a number 30a which forms the male member of a clutch of which the hub of the gear 23, suitably recessed as at 23b is the female part. In the position shown in the drawings the clutch 30 is operative to connect the shaft 24 in driving relation with the gear 23. In order to disconnect the drive of the shaft 24 the collar 30, being suitably knurled as shown in Fig. 1, is grasped and is slid back along the shaft, disengaging part 30a from the recess 23b of the hub, and retained in inoperative position by engagement with a pin 32a projecting from an end collar 32 which is secured to the shaft, the collar having, for example, a bayonet joint slot into which the pin takes.

The shaft 24 has fixed thereon a gear 33 meshing with a gear 34 which is fixed upon a shaft 35 supported in bearings 36 and 37. The shaft 35 has fixed thereon a second gear 38 which meshes with a gear 39, this latter gear being fixed upon a shaft 40. The functions of these parts just described will later be gone into in detail. From the above, however, it will be seen that the shaft 26 is continually connected in driving relation with the motor 21 and that the shaft 35 may be connected or disconnected from the drive of the motor as desired through the clutch mechanism 30. It will be noted that this driving mechanism just described makes for a very compact and simple arrangement of the various parts.

Considering now the shaft 26, this shaft is rotatably supported in bearing posts 41 and 42, and at its left-hand end carries a circular cutting tool 43. This tool is held in place upon the reduced end portion 26a of the shaft and up against a shoulder 26b by means of a nut 44, and is thus removable and replaceable by other tools by simply removing the nut. The cutting tool 43 is rapidly rotated by its drive from the motor 21.

Figure 10:
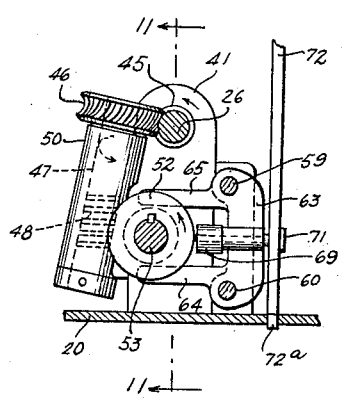
Figure 10 is a detail of parts of a driving mechanism of the apparatus.
Figure 11:
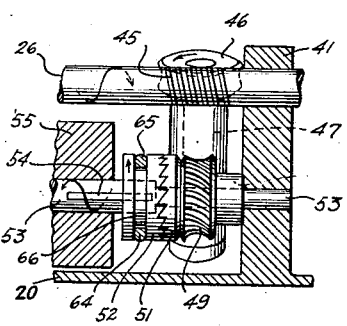
Figure 11 is a section taken substantially along the line 11—11 of Figure 10.

At its portion adjacent the bearing 41, the shaft 26 has formed thereon a thread or worm 45 with which engages a worm wheel 46. Referring to Figures 10 and 11, these parts are shown more in detail. The worm wheel 46 is fixed upon a shaft 47 which extends downwardly and has formed thereon a thread or worm 48 meshing with a worm wheel 49. Preferably the shaft 47 is encased in a casing 50 having therein an opening for the entrance of the worm wheel 49, the casing 50 forming a support and thrust bearing for the shaft. As best shown in Figure 11, the worm wheel 49 is mounted to rotate freely on a shaft 53 which is rotatably supported at its right-hand end in the post 41. On the left-hand face of this worm wheel is a clutch member 51 which may be formed integral with the worm wheel. A clutch member 52 is adapted to mate with the clutch member 51. This clutch member 52 is slidably mounted upon the shaft 53 and splined thereto by a suitable key 54. Thus the shaft 53 is adapted to be slowly rotated through the worm and worm wheel drive from the shaft 26. The drive of the shaft 53 may be thrown in or out by means of the clutch 52—51.

The shaft 53 carries thereon a cylinder 55 having in its cylindrical outer surface a cam groove 56 (Figure 1). As shown in Figures 1 and 2 and also in Figure 5, extending between and supported by a pair of uprights 57 and 58 conveniently positioned to the front of posts 41 and 52 respectively are a pair of horizontal rods 59 and 60. Slidably mounted upon these rods is a member 61 which carries upon its side facing the cam 55 a roller 62. This roller 62 (Fig. 1) engages with the slot 56 in the surface of the cam 55, the cam slot being shaped to move the member 61 back and forth along the supporting rods 59 and 60. In the position shown in the drawings, the member 61 is at its extreme left position. The groove 56 extends all the way around the cam 55 and is shaped to impart a uniform movement to the member 61. Starting from the position shown in the drawings, it will be seen that a complete rotation of the cam 55 will move the member 61 to the right and back again to its initial position.

Also mounted upon the supporting rods 59 and 60 to the right of the member 61 is a second slidable member 63 which is shown in detail in Figure 10. This member 63 is provided with a pair of inwardly projecting arms 64 and 65 which engage with a circumferential groove 66 formed in the slidable clutch member 52 (Figure 11). In the position shown in the drawings, the clutch member 52 is moved to the right to its position of engagement with the clutch member 51 to transmit drive to the cam 55. It will be seen that a movement of the member 63 to the left will, through the arms 64 and 65 disengage the clutch and halt the rotation of cam 55. As best shown in Figure 2, there are provided about the supporting rods 59 and 60 at the right of the member 63 a pair of compression springs 67 and 68 which continually urge the member 63 to the left and hence urge the clutch member 52 toward the position of disengagement. The member 63 carries a roller 69 which is adapted to engage the right-hand end surface of the cam 55 adjacent the edge thereof. This engagement of the cam 55 with the roller 69 is adapted to hold the member 63 to the right against the action of the springs 67 and 68 and thus hold the clutch member 52 in position of engagement at all times except when the cam is in such position of its rotation that it has moved the member 61 to its extreme left position, as shown in the drawings. At this point a recess 70 formed in the end surface of the cam 55 comes opposite the roller 69 and permits the member 63 to move to the left under the action of the springs 67 and 68, disengaging the clutch member 52. The member 63 has pivoted thereto by a screw 71 an upright lever 72 which is pivoted at its lower end 72a in the base 20, as shown in Figures 2 and 10. By means of the lever 72 the member 63 may be slid to the right manually against the action of the springs.

In the operation of this apparatus, the initial positions of the cam 55 and of the sliding member 61 are as shown in the drawings, the member 61 being at its extreme left position. In such position of the parts the recess 70 in the cam registers with the roller 69 and the springs 67 and 68 hold the clutch member 52 out, the drive of the cam 55 being thus disconnected. In order to start the drive of the cam, the member 63 is moved to the right by manual manipulation of the lever 72 to move the clutch member 52 into position of engagement, these parts are shown in the drawings in the resultant position. The cam 55 then starts to rotate and the recess 70 moves out of registry with the roller 69. Thereafter the end surface of the cam 55 holds the member 63 to the right and holds the clutch in, the drive of the cam now continuing without manually holding the lever 72. When the cam has made one complete rotation, moving the member 61 to the right and back to its initial or left-hand position, the recess 70 again comes into registry with the roller 69 and the springs 67 and 68 move the clutch member 52 to interrupt the drive of the cam. Thus the member 61 will move to the right and back again to its initial position and stop, the cycle being repeated upon manual manipulation of lever 72 as above noted.

Mounted in front of the cutter 43 is a carriage 73 which is slidably supported by a pair of legs 74 and 75 (see Fig. 2) upon a longitudinal shaft or rod 76 which is mounted within the base 20, the legs 74 and 75 projecting downwardly through a slot 162 in the top of the base. This carriage 73 is thus movable longitudinally in a direction substantially parallel to the direction of movement of the member 61, and the carriage is provided with means for supporting a key blank to be operated upon by the cutter 43 and with means for supporting a master key or guide key. Keys to be cut by the cutter 43 are of the type known as Yale keys or cylinder keys and in Figures 3 and 4 are illustrated a key blank 77 and a master key or guide key 78 of this type. The purpose of the cutting operation by the cutter 43 is accurately to reproduce in the key blank 77 the shape of the key 78.

Figure 6:
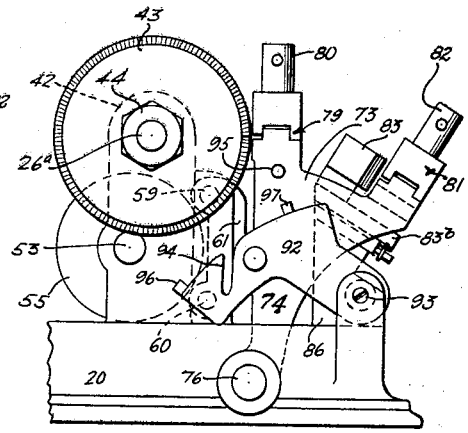
Figure 6 is similar to Figure 5 showing the parts in another position.

As best shown in Figures 5 and 6, the key blank 77 to be cut is clamped between the lower jaw and the upper jaw 79b of a clamping device 79 mounted upon the carriage 73 and operated to clamp or release the key blank by a clamping screw 80. The master key or guide key 78 is clamped upon the carriage 73 between the lower jaw 81a and the upper jaw 81b of a clamping device 81 operated by a clamping screw 82. The key blank 77 is clamped in the device 79 with its edge 77a facing toward the cutter 43 and the guide key 78 is clamped in position with its edge 78a facing a guide 83. The carriage 73 is capable of swinging about the axis of shaft, toward and away from the cutter 43, and a spring 84 (Figure 1) stretched between a projecting pin 85 on the carriage 73 and a pin on the sliding member 61 urges the carriage to swing inwardly toward the cutter 43. This spring thus urges the edge 77a of the key blank 77 against the cutter 43 and urges the edge 78a of the guide key 78 against the guide 83.

Figure 7:
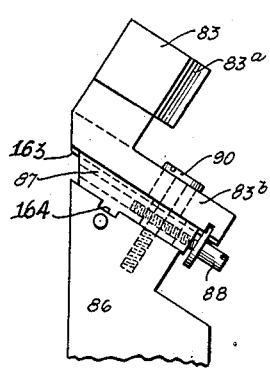
Figure 7 is a detail side view of parts of the apparatus shown in Figures 5 and 6.
Figure 8:
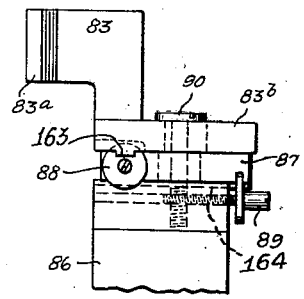
Figure 8 is a view from the right of Figure 7.
Figure 9:
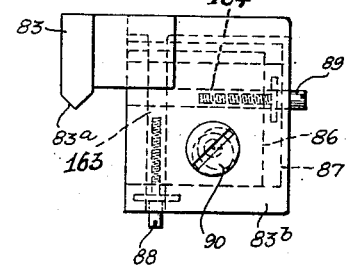
Figure 9 is a top plan view of the parts shown in Figures 7 and 8.

The guide 83 is shown in detail in Figures 7, 8 and 9. Facing the edge 78a of the guide key 78, the guide is provided with a projecting edge 83a which is of exactly the contour of the peripheral operating edge of the cutter 43. The guide 83 is supported upon an upright 86 (see Figs. 5 and 6) of the base 20 and is adjustable in position thereon so as to be capable of being accurately adjusted into the plane of the cutter 43 and also adjusted toward and away from the cutter. As shown in Figures 7, 8 and 9 the base 83b formed integral with the guide 83 is slidable in a direction toward and away from the cutter upon an intermediate plate 87 and may be adjusted in this direction by means of an adjusting screw 88. The parts 83b and 87 are suitably formed as at 163 for interfitting slidable engagement. The plate 87 thus slidably carrying the guide 83 is moreover adjustable transversely of the plane of the cutter, being slidable in this direction upon the upright 86 and slidably interfitted therewith as at 164 and adjustable in position by means of the adjusting screw 89. The guide 83 is locked in the position to which it is adjusted by means of a screw 90 passing through slots in the parts 83b and 87 and threaded into the upright 86. Moreover, it will be seen that by removing the screw 90 the guide 83 is removable and replaceable by other guide members suitable to cooperate with other cutting tools which may be substituted for the cutting tool 43.

The carriage 73 carrying the key blank 77 and the guide key 78 is adapted to be moved back and forth upon its supporting shaft 76 by connection with the member 61 driven from the cam 55. The driving connection between the carriage 73 and the member 61 preferably comprises an arm 91 (shown in Figures 1, 2 and 5) which is secured to the right-hand end of the carriage 73 and engages a recess 61a in the surface of the member 61. By swinging the carriage 73 about its supporting shaft 76 and in a direction away from the cutter 43 against the action of the spring 84, the arm 91 is moved out of recess 61a and hence out of engagement with the member 61 and the driving connection between the member 61 and the carriage 73 is thus broken.

As shown in Figures 1 and 2, there is provided at the left-hand end of the apparatus an arm 92 which is pivoted at its lower portion upon a supporting shaft or rod 93 rigidly supported upon the base 20. This arm 92 and the parts with which it coacts are shown in detail in Figures 5 and 6, the arm being shown in operative position in Figure 5 and in inoperative position in Figure 6. This arm is provided in its upper edge with a sloping slot 94 which is adapted to engage a pin or projecting lug 95 on the side of the carriage 73. When the arm is inoperative, as shown in Figure 6, it is swung downwardly and rests at its outer end upon the surface of the base 20. When moved upwardly to the position shown in Figure 5 the slot 94 engages with the pin 95, and the carriage 73 is thus swung outwardly about its supporting shaft 76 and away from the cutter 43. Moreover, the arm 92 is so shaped and its pivot 93 is so positioned that, when moved to the position shown in Figure 5, it locks the carriage in the outward position shown against the action of the spring 84 (see Fig. 1). In addition to thus moving the carriage 73 away from the cutter and holding the carriage in this position, the arm 92 is provided with a pair of projecting lugs 96 and 97 which serve as guides to aid in properly positioning the key blank 77 and the guide key 78 in their respective clamping devices 79 and 81, so that they will be properly relationed to the cutter 43 and the guide 83. In Figures 3 and 4 the lugs 96 and 97 are shown in operative relation to the key blank 77 and the guide key 78 with which they respectively coact. It will be seen that these two lugs provide shoulder stops or abutments against which the shoulders 77b and 78b of the key blank and guide key may be moved. When the key blank and guide key are thus relationed to the lugs 96 and 97 they are in proper position and properly alined in their respective clamping devices so that the cutter 43 will strike the key blank 77 at the same instant that the guide 83 strikes the guide key 78 and so that the cutting operation upon the key blank will start at precisely the proper point.

When the arm 92 is moved upwardly to operative position, thereby moving the carriage 73 away from the cutter 43, it will be seen (see Fig. 5) that the arm 91 moves out of recess 61a and thus breaks its driving connection with the member 61. Therefore the drive of the carriage 73 cannot be started until the arm 92 is moved downwardly into inoperative position. The apparatus is thus safeguarded, and damage to the lugs 96 and 97 or disrupting of the clamped keys which might occur by the operator carelessly starting the drive of the carriage without moving the arm 92 out of operative position, is effectively avoided.

In the operation of cutting a key blank of the cylinder type such as the key blank 77 shown in Figure 3, the parts are initially positioned as shown in Figs. 1 and 2 of the drawings. The cutter 43 is rapidly rotated through its driving connection with the motor 21. The cam 55 is so positioned that the member 61 and hence the carriage 73 in driving connection therewith are at their extreme left positions. The recess 70 in the cam 55 is in registry with the roller 69 on the member 63 and the clutch member 52 is thus held in position of disengagement from member 51. The operator moves the arm 92 upwardly, thereby drawing the carriage 73 outwardly (see Fig. 5) and locking the carriage in this outwardly drawn position against the action of the spring 84, thus also disengaging the arm 91 from member 61. The operator then places the guide key 78 in the clamping device 81 with the shoulder 78b thereof properly up against the lug 97, and places the key blank 77 in the clamping device 79 with the shoulder 77b properly up against the lug 96. The arm 92 is then moved downwardly to inoperative position, permitting the carriage 73 to move inwardly, the arm 91 thereon entering into driving engagement with the member 61. The operator then moves the lever 72 to the right holding the clutch member 52 in engagement with member 51 until the rotation of the cam 55 is started, cam 55 holding the clutch member 52 in engagement with member 51. The cam now drives the member 61 and with it the carriage 73 to the right and back again to their initial positions whereupon the roller 69 drops into the recess 70 of the cam 55 and the drive of the carriage is stopped.

During this movement of the carriage the surface 78a of the guide key 78 moves along the edge 83a of the guide 83, the carriage being urged inwardly by the spring 84. As the carriage moves along, it swings inwardly and outwardly about its supporting shaft 76 in accordance with the depth of the depressions in the surface of the guide key 78a. The key blank 77 partakes of this in and out movement as it moves across the cutter 43. The shape of the surface 78a of the guide key is thus accurately reproduced in the edge 77a of the key blank. During the operation, the key blank receives two cuts, moving relative to the cutter to the right and then back again to its initial position. As the key blank moves to the right it is given what might be termed a roughing cut by cutter 43 and as it moves back to the left it is given what might be termed a finishing cut. The shape of the guide key 78 is thus faithfully and neatly reproduced in the key blank 77 as well as expeditiously and with the greatest accuracy.

Referring now again to Figure 1, as was earlier described herein, the shaft 40 (shown at the right-hand portion of Figure 1) is driven through a train of gearing from the motor 21 and its drive may be thrown in or out through the medium of the clutch collar 30. This shaft 40 is supported in suitable bearing supports 100 and 101 and at its right-hand end carries a circular cutting tool 102 which is clamped in position upon the reduced end portion of the shaft and against a shoulder 103 by means of a nut 104. The cutter 102 may thus be rotated at high speed by the shaft 40 and is removable by means of the nut 104 for the purpose of substituting other cutting tools. This cutter 102 is adapted for cutting what are known as sideward notches in keys of the barrel type. In Figure 14 there is shown a key 108 of this type comprising what are known as the barrel portion 105 and the bit portion 106 having therein a sideward notch or groove 107. In order to cut this sideward notch 107 the key 108 is supported beneath the cutter 102, as shown in Figures 2 and 12. The key is clamped between two sliding jaw members 109 and 111 (see Figs. 2, 12, 13 and 1); the jaw members 109 and 111 are slidably mounted between two arms 112a and 112b of a carriage 112 to be more clearly described hereinafter. The arms 112a and 112b are suitably formed or shaped as at 112c and 112e (see Figs. 12 and 13) to slidably guide the members 109 and 112.

A screw 110 having a squared head to permit its manual operation passes through the jaw member 111 and is threaded into the jaw member 109, as is clearly shown in Figure 13 and by means of this screw 110 the jaw member 111 may be forced along the guiding ways 112c and 111e toward the jaw member 109 to permit the clamping of a key 108 (see Fig. 2) therebetween. The jaw member 111 is bored out as at 111a and through this bore passes the shank 113a of a screw generally indicated at 113, the threaded portion of the shank 113a being threaded into the jaw member 109. The screw 113 is provided with a squared head to permit its manual operation and adjacent the head thereof the screw 113 is provided with an annular groove 113b within which is received a suitably slotted plate member 170 secured to the carriage 112 as by the screw 171 (see Fig. 12). This arrangement permits rotation of the screw 113 but will be seen to prevent movement of the screw in an axial direction; hence when the screw 113 is turned it causes movement of the jaw member 109 along the arms 112a and 112b of the carriage 112 and thus permits adjustment of the jaw member 109 toward or away from the cutter 102 (see Fig. 2).

Referring still to Fig. 2, it will be seen that the key-engaging portions of the jaw members 109 and 111 are preferably of predetermined shape and it will be noted that the key-gripping portions thereof are curved or concaved as at 109a and 111b so as to permit the barrel portion (like the portion 105 of Fig. 14) of a key to be seated against one of the curved portions and to permit the bit portion (like the portion 106 of Fig. 14) to be seated against the other curved portion. Intermediate of these curved portions the jaw member 109 is provided with a pedestal 109b and the jaw member 111 is provided with a pedestal 111c (better shown in Fig. 2) and these pedestal portions are interleaved or telescoped one with respect to the other, as is clearly shown in Figure 13. The pedestal portions thus provide a solid support for the substantially middle portions of the bit portion of the key, the curved faces 109a and 111b of the jaw members acting to dependably seat the bit portion of the key solidly upon the telescoping pedestal portions 109b and 111c. Thus, the key may be solidly and dependably held for cutting action by the cutter 102.

The carriage 112 is slidable longitudinally of the plane of the cutter on a pair of supporting rods 114 and 115 which passes through it. These supporting rods at their left-hand ends as seen in Figures 12 and 13 are secured in an outwardly projecting arm 116a of a U-shaped bracket 116; the right-hand ends of the rods 114 and 115 are secured in the projecting part 116b of the bracket 116. The left-hand end of the bracket 116 is pivoted upon a pin 117 which projects outwardly from the upright 101. The right-hand end of the bracket 116 is provided therein with a vertical slot 118 through which passes a screw 119 threaded into the upright 101. The bracket 116 carrying the carriage 112 and the key clamping mechanism 109 may thus be raised or lowered by being swung about the pin 117. The apparatus is locked in the position to which it is thus vertically adjusted by tightening the screw 119. The carriage 112 carrying the key 108 may be moved along the supporting rods 114 and 115 by means of a feed screw 120.

In order to cut a sideward notch such as the sideward notch 107 in the key 108, the key is clamped in the clamping device 109—111, as shown in Figs. 2 and 12, and as above described. The position of the key relative to the cutter 102 may be properly adjusted transversely of the plane of the cutter by means of the adjusting screw 113 which, as will be clear from Fig. 13, moves the members 109 and 111 together as a unit along the ways 112c and 112e, and the depth of cut to be taken may be adjusted by means of swinging the supporting rods 114 and 115 about the screw 117 and thereafter locking the parts by means of the screw 119. The key having been clamped and thus properly adjusted, the carriage 112 is fed along by means of the screw 120 carrying the key along beneath the cutting tool 102. A sideward notch is cut which is of a width equal to the width of the cutting edge of the rotating tool. If a narrower notch is required, the tool 102 may be removed and replaced by a correspondingly narrower cutter. If a wider notch is required, the cutting tool may be replaced by a wider tool or, if desired, the notch may be cut in two or more passes of the key beneath the cutter, the position of the key relative to the cutter being altered by means of the screw 113.

Referring again to Figure 1 of the drawings, between the two bearing supports or uprights 100 and 101 is rotatably supported a member in the nature of a turret or spider 121 having a plurality of radially projecting arms, the arms in this instance being four in number and two thereof, 121a and 121b being visible in section in Figure 1. Each of these four arms carries one of a plurality of cutting tools which are adapted to be brought into position one at a time to operate upon a key blank carried in a clamping device 122 as will presently be described.

The rotatable member 121 is conveniently mounted about the shaft 40, the shaft 40 passing therethrough as shown in Figure 1. As also shown in this figure, the member 121 is positioned so that the cutting tool 123 carried by the arm 121b is in position to operate upon a key blank clamped in the clamping device 122. The arm 121a, spaced 180° from the arm 121b, carries a cutting tool 124 of a type different from the tool 123 and adapted to perform upon the key blank a different cutting operation. The tool 123 is fixed upon a shaft 123a, being clamped against a shoulder 123b thereof by means of a nut 125. The shaft or spindle 123a is rotatably supported in the arm 121b and at its left-hand end is provided with a pin 126 passing therethrough and secured therein. Shoulder 123b at one end and a nut 165 at the other end of the shaft prevent longitudinal movement thereof relative to the shaft supporting arm. When the member 121 is in the position shown in Figure 1, the left-hand end of the spindle 123a is in position to coact with a collar 127 which is mounted upon the right-hand end of the shaft 35. The collar 127 is splined to the shaft 35 so that it rotates therewith and is slidable along the end portion of the shaft 35 toward and away from the spindle 123a. In the position shown in the drawings the collar 127 is moved to the left at which position it is preferably held by means of a suitable spring acting between the collar and the shaft 35 and positioned within the collar. When the collar 127 is moved to the right it embraces the end portion of the spindle 123a and the projecting ends of the pin 126 enter a diametrical slot 128 of the collar. This slot is suitably notched as indicated so that when the collar is moved to the right to embrace the end portion of the spindle 123a and is then slightly rotated, the collar is prevented from moving to the left again under the urge of the spring therein. The collar 127 with the coacting pin 126 thus forms a detachable driving connection between the shaft 35 and the spindle 123a carrying the cutting tool 123. When the collar 127 is moved into position of driving engagement the cutter 123 is rapidly rotated directly from the shaft 35.

The cutting tool 124 is fixed upon a shaft or spindle 129 which is rotatably carried in the arm 121a and which is provided with means identical with those just described in connection with the spindle 123a for driving connection with the collar 127. The cutting tool 124 may be brought into position to operate upon the key blank held in the clamping device 122 by simply rotating the member 121 until the spindle 129 comes opposite the collar 127. The drive of the cutter 124 may then be connected as was the drive of the cutter 123. Referring to Figure 2 of the drawings, the remaining two arms 121c and 121d of the member 121 are shown. The arm 121c is provided with a spindle 130 shown as carrying a cutting tool 131, and the arm 121d is provided with a spindle 132. These spindles 130 and 132 are provided with means identical with that of the spindles 123a and 129 for forming a driving connection with the collar 127 on the shaft 35. The cutting tools carried by the spindles 123a, 129, 130 and 132 are removable and replaceable by other cutting tools by simply removing the nuts 125 which hold the respective cutting tools in place upon the spindles.

Referring again to Figure 1, the right-hand end of each of the spindles 123a, 129, 130 and 132 is provided with an axial recess 166 which is adapted to receive a pin 133. This pin is slidably supported in the upright 101 and on the side of the axis of the member 121 diametrically opposite the collar 127 on the shaft 35. The pin 133 is urged to the left by a spring 134 and is provided with a head 135 on the right-hand side of the upright 101 whereby the pin may be manually withdrawn from a recess 166 and against the action of the spring. This pin 133 serves in a restraining capacity and serves to steady the member 121, preventing rotation of the member about its axis while the individual tools are performing their cutting operations upon the key blank. The restraining pin coacts with the spindle which is diametrically opposite the spindle carrying the cutting tool which is performing its work. Thus, as shown in Figure 1, the pin 133 is in registry with the recess 166 of the spindle 129 while the spindle 123a is in operative position.

It will thus be seen that a variety of sizes or shapes of cutting tools may be carried by the member 121 and that each of these tools is in readiness to be brought instantly into position to be driven and to operate upon the key blank clamped in the clamping device 122. When a tool is operating upon a key blank the tool is dependably driven directly from the shaft 35 and, moreover, the turret member or spider 121 is dependably held in the position desired. The shaft 35 is driven through the clutch member 30 so that the drive of the collar 127 may conveniently be interrupted while it is being adjusted into or out of driving engagement with the spindles.

Considering now more particularly the mounting of the clamping device 122, this is mounted upon a carriage 136 which is shown in Figure 1 and more in detail in Figures 2 and 12. The carriage 136 is provided with a pair of upright legs 137 and 138 which, at their lower ends, are slidably carried upon a shaft 139. The shaft 139 is mounted in the base 20 beneath the upper surface thereof and the legs 137 and 138 project downwardly through slots 167 and 168 respectively in the base surface. The carriage 136 is thus movable back and forth along the shaft 139 in a direction parallel to the axes of rotation of the cutting tools carried by the spider 121 and, moreover, the carriage may be swung about the axis of the shaft 139 toward and away from the cutting tool.

Referring to Figure 12, the clamping device 122 is operated by means of a screw 140 and is shown in this figure as carrying therein a key blank 141 to be operated upon. The carriage 136 has thereon a second clamping device 142 which is operated by a screw 143 and which is adapted to hold a master key or guide key such as the key 144 shown in Figure 12. The key blank 141 shown supported in the clamping device 122 in Figure 12 to be operated upon by the cutters is a barrel type of key. This key blank is shown in Figure 15 with the cutter 123 in operative relation thereto, and in this figure is also shown the master key or guide key 144. The apparatus is adapted for cutting the key blank 141 to produce therein an exact duplicate of the guide key 144.

As is shown in Figure 15, a cutter in the nature of the cutter 123 may be employed to trim and square off the ends of the bit 145 of the key blank. When this operation is performed there in provided a guide member 146 which cooperates with the end surfaces of the bit 147 of the guide key 144. This guide member 146 is shown in Figure 12 and is seen to comprise a cylindrical rod which fits in an opening 148 passing through an upright lug 149 which projects upwardly from the base 20. The guide member 146 is held in place in the recess 148 by a screw 150, and is thus conveniently removable and replaceable by guide members of other shapes or sizes as desired. The recess 148 is so positioned that the guide member 146 is positioned exactly in the plane of the cutting tool 123, as is shown in Figure 15. In order to square off the front and rear ends of the bit 145 of the key blank, the carriage 146 is slid along the supporting rod 139 until the guide member 146 is in line with the corresponding edge of the bit 147 of the guide key 144. The carriage is then swung inwardly toward the cutting tool, carrying the key blank into engagement with the cutter 123. When the guide member 146 strikes the barrel 144a of the guide key (as shown in Figure 15) the inward movement of the carriage is checked, cutting ceases, and the edge of the bit 145 of the key blank is accurately squared off and cut.

The cutter 123 or one similar thereto having a wider or narrower cutting face as may be required, is employed to cut in the key blank the notches corresponding to the notches 147a of the guide key. In order to cut these notches 147a, the carriage 136 is moved so that the notch in the guide key which it is desired to reproduce in the key blank lines up with the guide 146 or with a similar guide which may be substituted for the guide 146. The carriage is then swung inwardly toward the cutting tool and the required notch is cut in the key blank, the cutting action ceasing when the guide strikes the base of the notch in the guide key. Preferably the guide which is used will be of a width equal to that of the notch in the guide key which it is desired be reproduced and the edge of the cutter will be of a corresponding width. The notches 147a of the guide key may thus be reproduced in the key blank 141 with the greatest accuracy both as to depth and as to width.

In order to cut in the key blank the notches corresponding to the end notches 147b of the guide key, a cutter is used which is similar in shape to the cutter 124 shown in section in Figure 1.

This cutter 124 is provided with two laterally facing cutting edges 124a and 124b. In Figure 16 the cutting edge 124a is shown operating upon the bit 145 of the key blank 141 to cut a notch in the forward edge of this part. Also in Figure 16 is shown the guide key 144 and a guide member 151 in engagement with the end notch of the bit 147, which notch is to be reproduced in the bit 145 of the key blank. The guide 151 it will be understood is shaped at its lower portion similar to the guide 146 and is supported in the recess 148 (Figure 12) and held in place therein by the screw 150. In the operation of cutting these end notches, the carriage 136 is swung toward the cutter 124 until the guide 151 lines up with the recess in the guide key 144 which it is desired to reproduce in the key blank 141. The carriage is then moved along its supporting shaft 139 until the guide 151 strikes the base of the notch in the guide key, arresting the movement of the carriage. The cutting edge 124a of the rotating cutter cuts a notch of exactly the required depth in the bit 145 of the key blank 141. In order to cut the notches in the rear end of the key blank bit the cutting edge 124b of the cutter 124 is employed as will be understood. It will be understood also that more than one cutter of the nature of the cutter 124 may be mounted upon the turret 121 so that cutting edges of different widths may be available. Also, any of the cutters carried by the spider 121 are removable from their shafts or spindles and replaceable by other cutters.

Referring to Figure 12, it will be seen that the clamping device 122 comprises two parts 122a and 122b between which the barrel of the key blank 141 is clamped. The lower part 122b rests upon the carriage 136 and has a longitudinally extending ridge which mates with a groove in the carriage. The clamping screw 140 passes downwardly through the parts 122a and 122b and threads into the carriage 136. The screw passes through the clamping parts substantially midway between its two sides and thus there are provided clamping means at either side of the screw, the clamping means on the right-hand side of the screw as viewed in Figure 12 holding the key blank 141. By loosening the screw 140, the entire clamping device including the parts 122a and 122b may be lifted upwardly so that the ridge on the bottom of the part 122b disengages the groove with which it mates in the carriage. The parts may then be swung through 180° so that the side of the clamping device opposite the side which is shown clamping the key blank 141 may be brought adjacent to the cutter. This latter side of the clamping device which is indicated by the numeral 122c is adapted for clamping a flat key as distinguished from a key of the barrel type. In Figure 17 the clamping device 122 is shown turned at 180° from its position shown in Figure 12 and clamping a flat key 152. In this figure also the cutter 123 is shown operating upon this flat key.

The clamping device 142 for clamping the guide key is similarly constructed to be capable of being turned through 180° so as to bring either side thereof adjacent to the guide 146, one side of the clamping device being adapted to clamp a key of the barrel type and the other side thereof being adapted for clamping a flat key. In Figure 18 the flat key blank 152 is shown being operated upon by the cutter 123 and a flat guide key 153 is shown in relation to a suitable guide member 146. Notches corresponding to those of the guide key 153 may be cut in the key blank 152 by lining up the notch of the guide key with the guide 146 and then moving the carriage toward the cutter. When the guide 146 strikes the base of the notch the movement of the carriage is arrested and the cut is made in the key blank 152 corresponding in depth to the notch in the guide key.

From the foregoing it will be seen that there is herein provided an apparatus which achieves the objects of this invention including many practical advantages. The apparatus is capable of a wide range of use and capable of operating with dependably accurate results under all conditions. The apparatus is compact and the operating mechanisms thereof are conveniently accessible and easily adjusted to meet the conditions under which the mechanism is used.

As many possible embodiments may be made of the above invention, and as many changes might be made in the embodiment above set forth, it is to be understood that all matter hereinbefore set forth or shown in the accompanying drawings, is to be interpreted as illustrative and not in a limiting sense.

I claim as my invention:

1. In apparatus of the class described, in combination, a cutting tool, means for holding a key blank for operation thereon by said tool, means mounting said key-holding means adapted to permit it to be moved past said tool and toward or away from said tool, a driven member for moving said mounting means past said tool, and means forming a connection with said driven member adapted to permit movement of said mounting means toward or away from said tool and adapted upon a predetermined movement away from said tool to become disconnected.

2. In apparatus of the class described, in combination, a cutting tool, a carriage having means adapted to hold a key blank for operation thereon by said tool, means mounting said carriage for movement back and forth past said tool, and means including a cam adapted to drive said carriage to carry said blank past said tool through a predetermined length of travel and to then interrupt said drive, means permitting relative movement between said cutting tool and said key blank-holding means in a direction toward or away from each other, and means operative, during said predetermined length of travel of said carriage, to cause such relative movement between said tool and said key blank-holding means as will give said blank the shape of a key.

3. In apparatus of the class described, in combination, a cutting tool, a carriage having means adapted to hold a key blank for operation thereon by said tool, means mounting said carriage for movement back and forth past said tool, driven means adapted upon being driven to move said carriage, means for driving said last means, means permitting relative movement between said tool and said key blank-holding means in a direction transversely to the movement of said carriage, means operative during movement of said carriage to cause relative movement between said tool and said blank-holding means in said transverse direction, thereby to give said key blank a key contour, and means adapted to disconnect said driving means upon completion of predetermined movement of said carriage.

4. In apparatus of the class described, in combination, a cutting tool, a carriage having means adapted to hold a key blank for operation thereon by said tool, means mounting said carriage for movement back and forth past said tool, a rotatable cam adapted when rotated to move said carriage, means adapted to rotate said cam, means permitting movement of said carriage in a direction toward or away from said tool, connections between said carriage and said cam adapted to permit movement of said carriage toward or away from said tool as said cam moves said carriage, and means adapted to disconnect said cam-rotating means from said cam upon completion of predetermined movement of said carriage.

5. In apparatus of the class described, in combination, a cutting tool, a carriage having means adapted to hold a key blank for operation thereon by said tool, means mounting said carriage for movement back and forth past said tool, means for causing said carriage, during movement thereof, to move toward or away from said tool according to a predetermined key pattern, a rotatable cam adapted when rotated to move said carriage and adapted in one complete rotation to move said carriage so as to carry said key blank across said tool and back to its initial position, means for rotating said cam, and a clutch through which said cam is driven.

6. In apparatus of the class described, in combination, a cutting tool, a carriage having means adapted to hold a key blank for operation thereon by said tool, means mounting said carriage for movement back and forth past said tool, means for causing said carriage, during movement thereof, to move toward or away from said tool according to a predetermined key pattern, a rotatable cam adapted when rotated to move said carriage and adapted in one complete rotation to move said carriage so as to carry said key blank across said tool and back to its initial position, means for rotating said cam, and means adapted to arrest the rotation of said cam upon completion of one complete rotation thereof.

7. In apparatus of the class described, in combination, a movable carriage, means upon said carriage adapted to hold a key blank for cutting operation thereon, means upon said carriage adapted to hold a master key, a cutting tool adapted to operate upon said key blank, a guide fixed in position with respect to said tool and adapted to engage the surface of said master key, spring means acting upon said carriage and adapted to press said key blank against said cutter and said master key against said guide, means adapted to move said carriage and said blank and said key therewith relative to said cutter and said guide, and gauging means movable into and out of position for fixing the position of said key blank and said master key relative to each other in said holding means therefor, said gauging means being adapted when operative to hold said carriage away from said tool and said guide against the action of said spring.

8. In apparatus of the class described, in combination, a movable carriage, means upon said carriage adapted to hold a key blank for cutting operation thereon, means upon said carriage adapted to hold a master key, a cutting tool adapted to operate upon said key blank, a guide fixed in position with respect to said tool and adapted to engage the surface of said master key, spring means acting upon said carriage and adapted to press said key blank against said cutter and said master key against said guide, means adapted to move said carriage and said blank and said key therewith relative to said cutter and said guide, and a member movable toward and away from said carriage and having thereon a pair of projecting parts adapted respectively when said member is moved toward said carriage to form abutments against which said key blank and said master key may be placed for proper positioning thereof in said holding means therefor upon said carriage, said member having associated therewith means adapted when operative to hold said carriage outwardly away from said tool against the action of said spring means.

9. In apparatus of the class described, in combination, a movable carriage, means upon said carriage adapted to hold a key blank for cutting operation thereon, means upon said carriage adapted to hold a master key, a cutting tool adapted to operate upon said key blank, a guide fixed in position with respect to said tool and adapted to engage the surface of said master key, spring means acting upon said carriage and adapted to press said key blank against said cutter and said master key against said guide means adapted to move said carriage and said blank and said key therewith relative to said cutter and said guide, and a member movable toward and away from said carriage and having thereon a pair of projecting parts adapted respectively when said member is moved toward said carriage to form abutments against which said key blank and said master key may be placed for proper positioning thereof in said holding means therefor upon said carriage, said member having means adapted to hold said carriage away from said tool and from said guide when said member is moved into operative position.

10. In apparatus of the class described, in combination, a movable carriage, means upon said carriage adapted to hold a key blank for cutting operation thereon, means upon said carriage adapted to hold a master key, a cutting tool adapted to operate upon said key blank, a guide fixed in position with respect to said tool and adapted to engage the surface of said master key, spring means acting upon said carriage and adapted to press said key blank against said cutter and said master key against said guide, means mounted independently of said carriage and driven longitudinally in a direction transverse to the plane of action of said cutter upon said blank, and a detachable driving connection between said last means and said carriage whereby said carriage is moved to carry said key blank across said cutter and said master key across said guide.

11. In apparatus of the class described, in combination, a movable carriage, means upon said carriage adapted to hold a key blank for cutting operation thereon, means upon said carriage adapted to hold a master key, a cutting tool adapted to operate upon said key blank, a guide fixed in position with respect to said tool and adapted to engage the surface of said master key, spring means acting upon said carriage and adapted to press said key blank against said cutter and said master key against said guide, and means adapted to drive said carriage to move said key blank thereon across said cutter and adapted to be disconnected from said carriage when said carriage is moved away from said cutter against the action of said spring.

12. In apparatus of the class described, in combination, a movable carriage, means upon said carriage adapted to hold a key blank for cutting operation thereon, means upon said carriage adapted to hold a master key, a cutting tool adapted to operate upon said key blank, a guide fixed in position with respect to said tool and adapted to engage the surface of said master key, spring means acting upon said carriage and adapted to press said key blank against said cutter and said master key against said guide, a member having a detachable connection with said carriage, and means adapted to drive said member longitudinally in a direction transverse to the plane of action of said cutter to correspondingly move said carriage connected therewith.

13. In apparatus of the class described, in combination, a movable carriage, means upon said carriage adapted to hold a key blank for cutting operation thereon, means upon said carriage adapted to hold a master key, a cutting tool adapted to operate upon said key blank, a guide fixed in position with respect to said tool and adapted to engage the surface of said master key, spring means acting upon said carriage and adapted to press said key blank against said cutter and said master key against said guide, a member having a detachable connection with said carriage, and means adapted to drive said member longitudinally in a direction transverse to the plane of action of said cutter to correspondingly move said carriage connected therewith, said driving means comprising a rotatively driven cam.

14. In apparatus of the class described, in combination, a movable carriage, means upon said carriage adapted to hold a key blank for cutting operation thereon, means upon said carriage adapted to hold a master key, a cutting tool adapted to operate upon said key blank, a guide fixed in position with respect to said tool and adapted to engage the surface of said master key, spring means acting upon said carriage and adapted to press said key blank against said cutter and said master key against said guide, a member having a detachable connection with said carriage, and means adapted to drive said member longitudinally in a direction transverse to the plane of action of said cutter to correspondingly move said carriage connected therewith, said driving means comprising means adapted to give said member and said carriage a longitudinal movement to carry said key blank across said cutter and back to its initial position.

15. In apparatus of the class described, in combination, a movable carriage, means upon said carriage adapted to hold a key blank for cutting operation thereon, means upon said carriage adapted to hold a master key, a cutting tool adapted to operate upon said key blank, a guide fixed in position with respect to said tool and adapted to engage the surface of said master key, spring means acting upon said carriage and adapted to press said key blank against said cutter and said master key against said guide, a member having a detachable connection with said carriage, and means adapted to drive said member longitudinally in a direction transverse to the plane of action of said cutter to correspondingly move said carriage connected therewith, said driving means being adapted to give said member and said carriage therewith a predetermined longitudinal movement, and means adapted to render inoperative said driving means upon completion of said predetermined movement.

16. In apparatus of the class described, in combination, a movable carriage, means upon said carriage adapted to hold a key blank for cutting operation thereon, means upon said carriage adapted to hold a master key, a cutting tool adapted to operate upon said key blank, a guide fixed in position with respect to said tool and adapted to engage the surface of said master key, spring means acting upon said carriage and adapted to press said key blank against said cutter and said master key against said guide, a member having a detachable connection with said carriage, means adapted to drive said member longitudinally in a direction transverse to the plane of action of said cutter to correspondingly move said carriage connected therewith, said driving means comprising a rotatably driven cam, a clutch through which said cam is driven, and means adapted to disengage said clutch upon completion of predetermined rotation of said cam.

17. In apparatus of the class described, in combination, a cutting tool, a carriage having means adapted to hold a key blank for operation thereon by said tool, means mounting said carriage for movement to carry said key blank past said tool, means permitting relative movement between said tool and said blank-holding means in a direction substantially transverse to the movement of said carriage past said tool, means adapted to give said carriage said movement including a rotatable cam and a clutch through which said cam is driven, means responsive to movement of the carriage past said tool for controlling said relative movement between said tool and said blank-holding means, and means adapted to disengage said clutch upon completion of a predetermined rotation of said cam.

18. In apparatus of the class described, in combination, a cutting tool, a carriage having means adapted to hold a key blank for operation thereon by said tool, means mounting said carriage for movement to carry said key blank past said tool, means permitting relative movement between said tool and said blank-holding means in a direction substantially transverse to the movement of said carriage past said tool, means adapted to give said carriage said movement including a rotatable cam and a clutch through which said cam is driven, means responsive to movement of the carriage past said tool for controlling said relative movement between said tool and said blank-holding means, means adapted to disengage said clutch upon completion of a predetermined rotation of said cam, and means for manually holding said clutch in position of engagement.

19. In apparatus of the class described, in combination, means adapted to grip and support a key blank for operation thereon, a plurality of independent cutting tools adapted when driven to operate upon a key blank supported in said means, means mounting said tools adjacent said support to enable said tools to be brought one at a time into operative relation to said key blank, and means for driving a selected tool when brought into operative relation to said key blank.

20. In apparatus of the class described, in combination, means adapted to grip and support a key blank for operation thereon, a plurality of independent cutting tools adapted to operate upon a key blank supported in said means, means for driving said tools, and means mounting said tools adjacent said support to enable said tools to be brought one at a time into operative relation to said driving means and into engagement with said key blank.

21. In apparatus of the class described, in combination, means adapted to grip and support a key blank for operation thereon, a plurality of independent cutting tools adapted to operate upon a key blank supported in said means, a rotatable support carrying said tools and adapted to be rotated to bring said tools one at a time into operative relation to said key blank, driving means for said tools, and means for connecting said driving means to each of said tools as it is brought into operative relation to said key blank.

22. In apparatus of the class described, in combination, means adapted to grip and support a key blank for operation thereon, a rotatable member adjacent said supporting means and having a plurality of radial arms, spindles rotatably mounted in said arms, and cutting tools carried by said spindles, said member being adapted to be rotated to bring said cutting tools successively into action upon said key blank.

23. In apparatus of the class described, in combination, means adapted to grip and support a key blank for operation thereon, a rotatable member adjacent said supporting means and having a plurality of radial arms, spindles rotatably mounted in said arms, cutting tools carried by said spindles, said member being adapted to be rotated to bring said cutting tools successively into action upon said key blank, and driving means adapted to be connected to drive each of said cutting tools as it is brought into operative relation to said key blank.

24. In apparatus of the class described, in combination, means adapted to grip and support a key blank for operation thereon, a rotatable member adjacent said supporting means and having a plurality of radial arms, spindles rotatably mounted in said arms, cutting tools carried by said spindles, said member being adapted to be rotated to bring said cutting tools successively into action upon said key blank, driving means adapted to be connected to drive each of said cutting tools as it is brought into operative relation to said key blank, and means for locking said rotatable member against rotation while said tools are in operation.

25. In apparatus of the class described, in combination, means adapted to grip and support a key blank of the barrel type, a rotatable member adjacent said supporting means, a plurality of rotatable cutting tools carried by said member, said cutting tools being of different shapes and adapted for individual operation upon said key blank to cut ward notches in the three edges of the bit thereof, said member being adapted to be rotated to bring said tools separately into operative relation to said key blank, and means for driving each of said tools.

26. In apparatus of the class described, in combination, a rotary cutting tool, a carriage adapted to support a key blank of the barrel type and to expose said key blank to the action of said tool for cutting in the bit thereof a side ward notch, means for adjusting said carriage to move said key blank toward and away from the axis of rotation of said tool, means for moving said carriage to adjust the position of said key blank in a direction parallel to the axis of rotation of said cutter, and means for moving said carriage to feed said key blank in a direction at right angles to said last direction.

27. In apparatus of the class described, in combination, a rotating cutting tool having a peripheral cutting edge, a stationary guide mounted substantially in the plane of said cutting tool and adjacent thereto, a carriage, means upon said carriage adapted to hold a key blank for engagement by said cutter, means upon said carriage adapted to hold a master key in position to engage said guide, means mounting said carriage for movement to carry said key blank across said cutter and said master key across said guide, and a gauging device having a pair of surfaces adapted respectively for positioning said key blank and said master key upon said carriage, said two surfaces lying in a plane parallel to the plane of said cutter.

28. In apparatus of the class described, in combination, a rotating cutting tool having a peripheral cutting edge, a stationary guide mounted substantially in the plane of said cutting tool and adjacent thereto, a carriage, means upon said carriage adapted to hold a key blank for engagement by said cutter, means upon said carriage adapted to hold a master key in position to engage said guide, means mounting said carriage for movement to carry said key blank across said cutter and said master key across said guide, a gauging device having a pair of surfaces adapted respectively for positioning said key blank and said master key upon said carriage, said two surfaces lying in a plane parallel to the plane of said cutter, and means mounting said gauging device for movement into and out of operative position in a direction substantially transverse to the direction of movement of said carriage.

29. In apparatus of the class described, in combination, a movable carriage, means upon said carriage adapted to hold a key blank for cutting operation thereon, means upon said carriage adapted to hold a master key, a cutting tool adapted to operate upon said key blank, a guide fixed in position with respect to said tool and adapted to engage the surface of said master key, spring means acting upon said carriage and adapted to press said key blank against said cutter and said master key against said guide, means adapted to move said carriage and said blank and said key therewith relative to said cutter and said guide, a gauging means adapted for fixing the position of said key blank and said master key relative to each other in said holding means, means mounting said gauging means for movement into and out of operative position in a direction substantially transverse to the direction of movement of said carriage, a projection upon said carriage positioned in the line of movement of said gauging means, said gauging means having therein a slot adapted to coact with said projection to hold said carriage outwardly against the action of said spring when said gauging means is in operative position.

30. In apparatus of the class described, in combination, a cutting tool, a carriage, means upon said carriage adapted to hold a key blank to be operated upon by said tool, means mounting said carriage for movement to carry said key blank across said cutter and for movement toward and away from said cutter, driving means for driving said carriage to give thereto said first movement, and a driving connection between said carriage and said driving means which is disconnected by movement of said carriage to carry said key blank away from said tool.

31. In apparatus of the class described, in combination a cutting tool, a carriage, means upon said carriage adapted to hold a key blank to be operated upon by said tool, means mounting said carriage for movement to carry said key blank across said cutter and for movement toward and away from said cutter, driving means for driving said carriage to give thereto said first-mentioned movement, a driving connection between said carriage and said driving means which is disconnected by movement of said carriage to carry said key blank away from said tool, a gauge movable into and out of operative position to position said key in said carriage, and means associated with said gauge adapted to hold said carriage away from said tool.

32. In apparatus of the class described, in combination, a rotating driving shaft, a rotating cutter driven therefrom, a carriage mounted for movement past said cutter, means on said carriage adapted to hold a key blank to be operated upon by said cutter, means permitting relative movement between said cutter and said blank-holding means but in a direction substantially transversely to the movement of said carriage, a cam driven by said shaft at a speed of rotation slower than that of said cutter, means actuated by said cam adapted to drive said carriage to move said key blank across said cutter, and means operative during movement of said carriage to cause relative movement between said cutter and said blank-holding means according to a predetermined pattern.

33. In apparatus of the class described, in combination, a rotating driving shaft, a rotating cutter driven therefrom, a carriage mounted for movement past said cutter, means on said carriage adapted to hold a key blank to be operated upon by said cutter, means permitting relative movement between said cutter and said blank-holding means but in a direction substantially transversely to the movement of said carriage, a cam driven by said shaft at a speed of rotation slower than that of said cutter, means actuated by said cam adapted to drive said carriage to move said key blank across said cutter, and means operative during movement of said carriage to cause relative movement between said cutter and said blank-holding means according to a predetermined pattern, and means for interrupting the drive of said cam without interrupting the drive of said cutter.

34. In apparatus of the class described, in combination, a rotating driving shaft, a rotating cutter driven therefrom, a carriage mounted for movement past said cutter, means on said carriage adapted to hold a key blank to be operated upon by said cutter, means permitting relative movement between said cutter and said blank-holding means but in a direction substantially transversely to the movement of said carriage, a cam driven by said shaft at a speed of rotation slower than that of said cutter, means actuated by said cam adapted to drive said carriage to move said key blank across said cutter, and means operative during movement of said carriage to cause relative movement between said cutter and said blank-holding means according to a predetermined pattern, and means for breaking the driving connection between said cam and said carriage.

35. In apparatus of the class described, in combination, a rotating driving shaft, a rotating cutter driven therefrom, a carriage mounted for movement past said cutter, means on said carriage adapted to hold a key blank to be operated upon by said cutter, means permitting relative movement between said cutter and said blank-holding means but in a direction substantially transversely to the movement of said carriage, a cam driven by said shaft at a speed of rotation slower than that of said cutter, means actuated by said cam adapted to drive said carriage to move said key blank across said cutter, and means operative during movement of said carriage to cause relative movement between said cutter and said blank-holding means according to a predetermined pattern, and automatic means adapted to interrupt the said drive of said carriage upon completion of a predetermined movement thereof.

36. In apparatus of the class described, in combination, a rotating driving shaft, a rotating cutter driven therefrom, a carriage mounted for movement past said cutter, means on said carriage adapted to hold a key blank to be operated upon by said cutter, means permitting relative movement between said cutter and said blank-holding means but in a direction substantially transversely to the movement of said carriage, a cam driven by said shaft at a speed of rotation lower than that of said cutter means actuated by said cam adapted to drive said carriage to move said key blank across said cutter, and means operative during movement of said carriage to cause relative movement between said cutter and said blank-holding means according to a predetermined pattern, a clutch through which said cam is driven, and means adapted to disengage said clutch upon predetermined movement of said carriage.

37. In apparatus of the class described, in combination, a rotating driving shaft, a rotating cutter driven therefrom, a carriage mounted for movement past said cutter, means on said carriage adapted to hold a key blank to be operated upon by said cutter, a cam driven by said shaft at a speed of rotation slower than that of said cutter, means actuated by said cam adapted to drive said carriage to move said key blank across said cutter, said carriage being mounted also for movement toward and away from said cutter, and said driving connection between said carriage and said cam being broken by movement of said carriage away from said cutter.

38. In apparatus of the class described, in combination, a rotating cutter, a carriage mounted for movement past said cutter, means on said carriage adapted to hold a key blank for operation thereon by said cutter, rotating driving means adapted to move said carriage to carry said key blank across said cutter and including a clutch, spring means tending to disengage said clutch, and a cam rotating with said driving means adapted to hold said clutch in position of engagement against the action of said spring means throughout a portion of its rotation and to permit said spring means to disengage said clutch upon predetermined movement of said carriage.

39. In apparatus of the class described, in combination, means adapted to grip and support a key blank, a rotatable member adjacent said supporting means, a plurality of cutting tools carried by said member, one of said cutting tools having a peripheral cutting edge for cutting one kind of notch in a key blank and another of said tools having a cutting edge extending substantially at right angles to said peripheral cutting edge for cutting another kind of notch in said key blank, said member being rotatable to bring said tools separately into operative relation to said key blank, and means mounting said key supporting means and said tools adapted to permit relative movement therebetween in directions to permit either of said cutting edges to perform a cutting operation.

40. In apparatus of the class described, in combination, means for holding a key blank, a plurality of tools adapted when driven to perform different cutting operations on a key blank, certain of said tools being shaped to cut notches of different widths and one of said tools being shaped to cut a notch in said key blank extending at right angles to the notch cut by another of said tools, means mounting said tools adjacent said holding means adapted to permit said tools to be brought one at a time into operative position relative to said key blank, means for driving a tool that is brought in operative position relative to said blank, and means for locking a tool in operative position relative to the key blank while permitting driving of said tool.

41. In apparatus of the class described, in combination, means for holding a key blank, a plurality of tools adapted to perform different cutting operations on a key blank, certain of said tools being shaped to cut notches of different widths and one of said tools being shaped to cut a notch in said key blank extending at right angles to the notch cut by another of said tools, means mounting said tools adjacent said holding means adapted to permit said tools to be brought one at a time into operative position relative to said key blank, a locking member, and a plurality of means, one for each tool, for coaction with said locking member to lock a tool in operative position relative to the key blank.

42. In apparatus of the class described, in combination, means for holding a key blank, a plurality of tools adapted to perform different cutting operations on a key blank, certain of said tools being shaped to cut notches of different widths and one of said tools being shaped to cut a notch in said key blank extending at right angles to the notch cut by another of said tools, means mounting said tools adjacent said holding means adapted to permit said tools to be brought one at a time into operative position relative to said key blank, driving means, means for making driving connection between said driving means and a tool when the latter is brought into operative position relative to the key blank, and means for locking the tool in said operative position.

43. In apparatus of the class described, in combination, means for holding a key blank, a plurality of tools each adapted to perform a cutting operation on a key blank, means mounting said tools adjacent said holding means adapted to permit said tools to be brought one at a time into operative position relative to said key blank, each of said tools having a spindle, a driven member positioned so that, as a tool is brought into operative position relative to the key blank, the spindle of said tool is brought into operative position relative to said driven member, and means for making a driving connection between said driven member and said spindle.

44. In apparatus of the class described, in combination, means for holding a key blank, a plurality of tools each adapted to perform a cutting operation on a key blank, means mounting said tools adjacent said holding means adapted to permit said tools to be brought one at a time into operative position relative to said key blank, each of said tools having a spindle, a driving member positioned so that, as a tool is brought into operative position relative to the key blank, the spindle of said tool is brought into operative position relative to said driving member, a clutch member associated with said driving member, and mating clutch means associated with each of said spindles for making driving connection with said driving member as a spindle is brought into operative position relative thereto.

45. In apparatus of the class described, in combination, a key blank chuck, a rotary cutter for operating upon a key blank in said chuck, a shaft for driving said cutter, a support rotatable about said shaft and carrying a plurality of tools adapted to operate on a key blank, and means for holding a key blank, said support being adapted to be rotated about said shaft to bring said tools one at a time into action upon the key blank supported in said means.

46. In apparatus of the class described, in combination, a rotary cutting tool, clamping means for holding a key blank for operation thereon by said tool, said means including supporting ways extending in a direction transversely of the plane of said tool, a pair of jaw members slidably mounted in said ways, means acting upon one of said members for adjusting it along said ways, and means for forcing the other of said members toward said one member to grip a key blank therebetween.

47. In apparatus of the class described, in combination, a key cutting tool, clamping means for holding a key blank for operation thereon by said tool, said clamping means including a pair of jaw members, means for moving one of said members toward or away from the other, and means forming a pedestal intermediate of said jaw members for supporting an intermediate portion of a key blank clamped between said jaw members.

48. In apparatus of the class described, in combination, a key cutting tool, clamping means for holding a key blank for operation thereon by said tool, said clamping means including a pair of jaw members, means for moving one of said members toward or away from the other, and a pedestal associated with each jaw member but spaced therefrom in a direction toward the other jaw member, said pedestals being shaped so that one slides laterally of the other as one of said jaw members is moved toward or away from the other.

49. In apparatus of the class described, in combination, a key cutting tool, clamping means for holding a key blank for operation thereon by said tool, said clamping means including a pair of jaw members having reentrant key-engaging faces for clamping a key therebetween, and means forming a pedestal intermediate of said jaw members for supporting an intermediate portion of a key blank clamped therebetween.

50. In apparatus of the class described, in combination, a rotatable member, a plurality of driven cutting tools carried by said member, said cutting tools being of different shapes and adapted for individual and different cutting operation upon the same key blank or upon key blanks of different types, key-holding means, said means including a plurality of clamping portions, each adapted to clamp a different type of key blank, and means mounting said key-holding means adapted to permit the clamping portions thereof to be selected to suit the type of key blank to be operated upon and to be brought as desired into operative position relative to said rotary member, said member being rotatable to permit selection of the tool or tools carried thereby and to position a selected tool or successively selected tools operatively relative to the key blank held by the selected clamping portion.

51. In apparatus of the class described, in combination, a support, a plurality of driven cutting tools of different shapes and adapted to perform different cutting operations upon the same key blank or upon key blanks of different types, means mounting said tools adjacent said support to enable said tools to be selected and brought one at a time into operative position relative to said support, means provided with a plurality of clamping portions each adapted to clamp a different type of key blank, and means mounting said last-mentioned means on said support to enable said clamping portions to be selected and positioned one at a time to permit a key blank carried by a selected clamping portion to be operated upon by a selected tool or by successively selected tools.

52. In apparatus of the class described, in combination, means for holding a key blank, a plurality of tools each adapted to perform a cutting operation on a key blank, means mounting said tools adjacent said holding means adapted to permit said tools to be brought one at a time into operative position relative to said key blank, each of said tools having a spindle, means for driving the spindle of a selected tool, and means adapted releasably to engage a spindle to hold said mounting means in position.

53. In apparatus of the class described, in combination, means for holding a key blank, a plurality of tools each adapted to perform a cutting operation on a key blank, means mounting said tools adjacent said holding means adapted to permit said tools to be brought one at a time into operative position relative to said key blank, each of said tools having a spindle, a driven member, means forming a releasable driving connection between said driven member and the spindle of a selected tool, and means for releasably engaging one of the remaining spindles to hold said mounting means and said selected tool in position.

54. In apparatus of the class described, in combination, a cutting tool, a carriage having means adapted to hold a key blank for operation thereon by said tool, means adapted to drive said carriage to carry said key blank across said tool for first a roughing cut and then a finishing cut, means adapted to cause relative movement between said carriage and said tool, during both of said cuts, according to a predetermined key pattern, a clutch mechanism through which said carriage is driven, and means adapted to cause said clutch mechanism to arrest the drive of said carriage upon completion of said finishing cut.

55. In apparatus of the class described, in combination, means adapted to grip and support a key of the barrel type, a key blank, a rotatable member adjacent said supporting means, a plurality of rotary cutting tools carried by said member, one of said cutting tools having a peripheral cutting edge and another of said tools having an annular cutting edge, said two tools rotating, when driven, about substantially parallel axes and said cutting edges being adapted respectively to cut end notches and ward notches in the bit of a key blank of the barrel type held in said blank-supporting means, said member being rotatable to bring said tools separately into operative relation to said key blank, and means mounting said key-supporting means and said tools adapted to permit relative movement therebetween in directions to permit either of said cutting edges to perform a cutting operation.

56. In apparatus of the class described, in combination, a cutting tool, means for holding a key blank for operation thereon by said tool, means mounting said key-holding means adapted to permit it to be moved past said tool and toward or away from said tool, a driven member for moving said mounting means past said tool, means forming a connection with said driven member adapted to permit movement of said mounting means toward or away from said tool and adapted upon a predetermined movement away from said tool to become disconnected, and gauging means movable into and out of position for fixing the position of a key blank relative to said holding means operating, when moved into position relative to said holding means, to hold said mounting means away from said tool and in a position wherein said mounting means is disconnected from said driven member.

57. In apparatus of the class described, in combination, a cutting tool, means for holding a key blank for operation thereon by said tool, means mounting said key-holding means adapted to permit it to be moved past said tool and toward or away from said tool, a driven member for moving said mounting means past said tool, means forming a connection with said driven member adapted to permit movement of said mounting means toward or away from said tool and adapted upon a predetermined movement away from said tool to become disconnected, gauging means for fixing the position of said key blank relative to said holding means therefor, and means movably mounting said gauging means so that movement thereof into operative position relative to said holding means gives said mounting means said predetermined movement away from said tool and effects disconnection of said connection.

58. In apparatus of the class described, in combination, a cutting tool, means for holding a key blank for operation thereon by said tool, means mounting said key-holding means adapted to permit it to be moved past said tool and toward or away from said tool, a driven member for moving said mounting means past said tool, means forming a connection with said driven member adapted to permit movement of said mounting means toward or away from said tool and adapted upon a predetermined movement away from said tool to become disconnected, gauging means for fixing the position of said key blank relative to said holding means therefor, means movably mounting said gauging means so that movement thereof into operative position relative to said holding means gives said mounting means said predetermined movement away from said tool and effecting disconnection of said connection, and means causing said gauging means to hold the parts moved thereby in position to maintain disconnection of said connection.

59. In apparatus of the class described, in combination, a cutting tool, means for holding a key blank for operation thereon by said tool, means mounting said key-holding means adapted to permit it to be moved past said tool and toward or away from said tool, driving means including a detachable connection for moving said mounting means past said tool, gauging means movable into and out of position for fixing the position of a key blank relative to said holding means, and means responsive to movement of said gauging means into position relative to said holding means for breaking said driving connection.

60. In apparatus of the class described, in combination, a cutting tool, means for holding a key blank for operation thereon by said tool, means for holding a master key, a guide adapted for coaction with said master key, means mounting said two holding means to permit the latter to be moved toward or away from said tool and guide, and gauging means movable into and out of position for fixing the position of said key blank and said master key relative to each other in said holding means therefor, said gauging means being adapted when operative to hold said mounting means in a position such that said two holding means are respectively away from said tool and said guide.

61. In apparatus of the class described, in combination, a cutting tool, means for holding a key blank for operation thereon by said tool, means for holding a master key, a guide adapted for coaction with said master key, means mounting said two holding means to permit the latter to be moved toward or away from said tool and guide, pivoted gauging means adapted, when swung in one direction about its pivot, to move into a position relative to said two holding means to permit fixing of the key blank and master key relative to each other in said two holding means and when swung in the other direction about its pivot to be moved out of operative relation to said two holding means, and means causing said gauging means when swung in said first-mentioned direction about its pivot to hold said mounting means in such a position that said two holding means thereon are respectively held away from said tool and said guide.

62. In apparatus of the class described, in combination, a cutting tool, means for holding a key blank for operation thereon by said tool, means for holding a master key, a guide adapted for coaction with said master key, pivoted means mounting said two holding means for movement in a direction toward or away from said tool and guide, and pivoted gauging means adapted when swung in one direction about its pivot to be moved into a position for fixing a key blank and master key relative to each other in said two holding means, the pivot of said gauging means and the pivot of said mounting means being so displaced that said mounting means, when swung away from said tool and gauge, is held by said gauging means.

63. In apparatus of the class described, in combination, a cutting tool, means for holding a key blank for operation thereon by said tool, means mounting said key-holding means adapted to permit it to be moved past said tool and toward or away from said tool, driving means for moving said mounting means past said tool, means operative after a predetermined movement of said mounting means past said tool for disconnecting said driving means, and means operative upon a predetermined movement of said mounting means in a direction away from said tool for disconnecting said driving means.

64. In apparatus of the class described, in combination, a cutting tool, means for holding a key blank for operation thereon by said tool, means mounting said key-holding means adapted to permit it to be moved past said tool and toward or away from said tool, driving means for moving said mounting means past said tool, means operative after a predetermined movement of said mounting means past said tool for disconnecting said driving means, means operative upon a predetermined movement of said mounting means in a direction away from said tool for disconnecting said driving means, and gauging means movable into and out of position for fixing the position of a key blank relative to said holding means therefor, said gauging means being adapted when operative to maintain said driving means disconnected.

65. In apparatus of the class described, in combination, a cutting tool, movable means for holding a key blank for operation thereon by said key, means for moving said holding means past said tool, means for stopping movement of said holding means and responsive to movement of said holding means in a direction away from said cutting tool, and additional means for stopping movement of said holding means in a direction past said tool.

66. In apparatus of the class described, in combination, a cutting tool, means for holding a key blank for operation thereon by said tool, means mounting said key-holding means adapted to permit it to be moved past said tool and toward or away from said tool, mechanism including two disruptable driving connections for moving said mounting means past said tool, means operative upon predetermined movement of said mounting means in a direction past said tool for disrupting one of said driving connections, and means operative upon a predetermined movement of said mounting means in a direction away from said tool to disrupt the other of said driving connections.

67. In apparatus of the class described, in combination, a cutting tool, means for holding a key blank for operation thereon by said tool, means mounting said key-holding means adapted to permit it to be moved past said tool and toward or away from said tool, cam means having one portion for causing movement of said mounting means in a direction past said tool and having another operating portion, and means controlled by said other operating portion of said cam means for controlling the drive of said cam.

68. In apparatus of the class described, in combination, a cutting tool, means for holding a key blank for operation thereon by said tool, means mounting said key-holding means adapted to permit it to be moved past said tool and toward or away from said tool, driving mechanism including disruptable connection means for moving said mounting means past said tool, manual means for controlling said connection means, spring means affecting said connection means, and means responsive to a certain movement of said mounting means for disrupting said connection means.

69. In apparatus of the class described, in combination, a cutting tool, means for holding a key blank for operation thereon by said tool, means mounting said key-holding means adapted to permit it to be moved past said tool and toward or away from said tool, driving mechanism including a driving member and a mating driven member engageable with said driving member for moving said mounting means past said tool, means for moving said driven member out of engagement with said driving member for halting the movement of said mounting means past said tool, and means responsive to a certain movement of said mounting means for operating said disengaging means.

70. In apparatus of the class described, in combination, a cutting tool, means for holding a key blank for operation thereon by said tool, means mounting said key-holding means adapted to permit it to be moved past said tool and toward or away from said tool, driving mechanism including a driving member and a mating driven member engageable with said driving member for moving said mounting means past said tool, means operating during movement of said mounting means past said tool to control the movement thereof toward or away from the tool to give the key blank a key contour, means for moving said driven member out of engagement with said driving member for halting the movement of said mounting means past said tool, a control member for said driven member, manually operated means for actuating said control member, and means responsive to a certain movement of said mounting means for actuating said control member.

71. In apparatus of the class described, in combination, a cutting tool, means for holding a key blank for operation thereon by said tool, means mounting said key-holding means adapted to permit it to be moved past said tool and toward or away from said tool, driving mechanism including a driving member and a mating driven member engageable with said driving member for moving said mounting means past said tool, means operating during movement of said mounting means past said tool to control the movement thereof toward or away from the tool to give the key blank a key contour, means for moving said driven member out of engagement with said driving member for halting the movement of said mounting means past said tool, a control member for said driven member, a spring-biased lever for manually actuating said control member, and means for moving said lever in response to a certain movement of said mounting means.

72. In apparatus of the class described, in combination, a support carrying a cutting tool, a support carrying means for holding a key blank for operation thereon by said tool, means mounting one of said supports for movement in the direction of the length of the key blank thereby to cause a relative traverse between said tool and said blank to take place, driving mechanism including a driving member and a mating driven member engageable with said driving member for moving said movable support to cause said traverse to take place, means for moving said driven member out of engagement with said driving member for halting the said relative traverse between said tool and said blank, means operative during said movement of said movable support to change the depth of cut of said cutting tool to give said key blank in said holding means a key contour, and means automatically operative after the completion of a sufficient traversing movement to complete the key contour for operating said disengaging means.

73. In apparatus of the class described, in combination, a support carrying a cutting tool, a support carrying means for holding a key blank for operation thereon by said tool, means mounting one of said supports for movement in the direction of the length of the key blank thereby to cause a relative traverse between said tool and said blank to take place, driving mechanism including a driving member and a mating driven member engageable with said driving member for moving said movable support to cause said traverse to take place, a movable member adapted upon movement into one position to cause engagement of said driving and driven members and upon movement into another position to cause disengagement therebetween, means for manually moving said movable member into said first position, means for holding said movable member in said first position, means dependent upon a certain relative traversing movement for effecting movement of said movable member into said second-mentioned position, and means operative during relative traversing movement to change the depth of cut of said tool thereby to give said key blank a key contour.

In testimony whereof, I have signed my name to this specification this 28th day of January, 1926.

HERMAN HANSEN.